United States Patent
Martorana et al.

(10) Patent No.: US 6,778,908 B2
(45) Date of Patent: Aug. 17, 2004

(54) ENVIRONMENTALLY MITIGATED NAVIGATION SYSTEM

(75) Inventors: Richard T. Martorana, Andover, MA (US); Michael E. Ash, Lexington, MA (US)

(73) Assignee: The Charles Stark Draper Laboratory, Inc., Cambridge, MA (US)

( * ) Notice: Subject to any disclaimer, the term of this patent is extended or adjusted under 35 U.S.C. 154(b) by 0 days.

(21) Appl. No.: 10/408,704

(22) Filed: Apr. 7, 2003

(65) Prior Publication Data

US 2003/0236628 A1 Dec. 25, 2003

Related U.S. Application Data

(60) Provisional application No. 60/391,549, filed on Jun. 25, 2002, and provisional application No. 60/400,465, filed on Aug. 1, 2002.

(51) Int. Cl.[7] .............................................. G01V 1/40
(52) U.S. Cl. ...................................... 702/9; 73/152.13
(58) Field of Search ............................ 702/9, 6; 73/159, 73/152.13; 175/236, 45, 57; 33/304

(56) References Cited

U.S. PATENT DOCUMENTS

| | | | |
|---|---|---|---|
| 3,079,696 A | 3/1963 | van Rooyen | 33/324 |
| 3,883,788 A | 5/1975 | Storey, Jr. | 318/648 |
| 4,071,959 A | 2/1978 | Russell et al. | 33/312 |
| 4,454,756 A | 6/1984 | Sharp et al. | 73/152.54 |
| 4,537,067 A * | 8/1985 | Sharp et al. | 73/152.13 |
| 4,594,790 A | 6/1986 | Engebretson | 33/304 |
| 4,696,112 A | 9/1987 | Hoffman | 33/304 |
| 5,156,056 A | 10/1992 | Pittman et al. | 74/5.6 D |
| 5,432,699 A | 7/1995 | Hache et al. | 702/9 |
| 5,657,547 A | 8/1997 | Uttecht et al. | 33/304 |
| 5,806,195 A | 9/1998 | Uttecht et al. | 33/304 |
| 6,216,804 B1 * | 4/2001 | Aumann et al. | 175/236 |
| 6,267,185 B1 | 7/2001 | Mougel et al. | 175/57 |
| 6,347,282 B2 | 2/2002 | Estes et al. | 702/6 |

OTHER PUBLICATIONS

US 6,151,553, 11/2000, Estes et al. (withdrawn)

* cited by examiner

Primary Examiner—John Barlow
Assistant Examiner—Victor J. Taylor
(74) Attorney, Agent, or Firm—Iandiorio & Teska

(57) ABSTRACT

An environmentally mitigated navigation system includes a thermal isolating chamber, an inertial measurement unit that can include individual gyroscopes and accelerometers for making inertial measurements, and a temperature control system; the temperature control system includes a thermoelectric cooling system, which in a powered mode maintains the inertial measurement unit at a substantially predetermined temperature, and a phase change device for maintaining the inertial measurement unit or inertial sensors at substantially a predetermined temperature in an unpowered mode; the phase change device substantially maintains the predetermined temperature by changing phase to define a stable temperature window for the inertial measurement unit or individual sensors to make inertial measurements during the unpowered mode as well as during the powered mode.

21 Claims, 5 Drawing Sheets

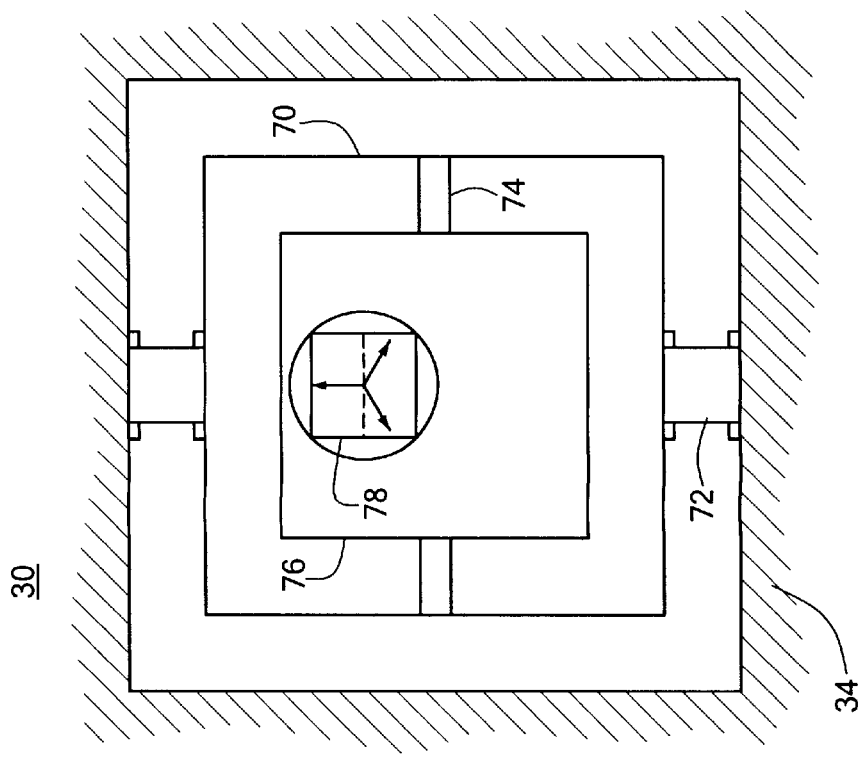
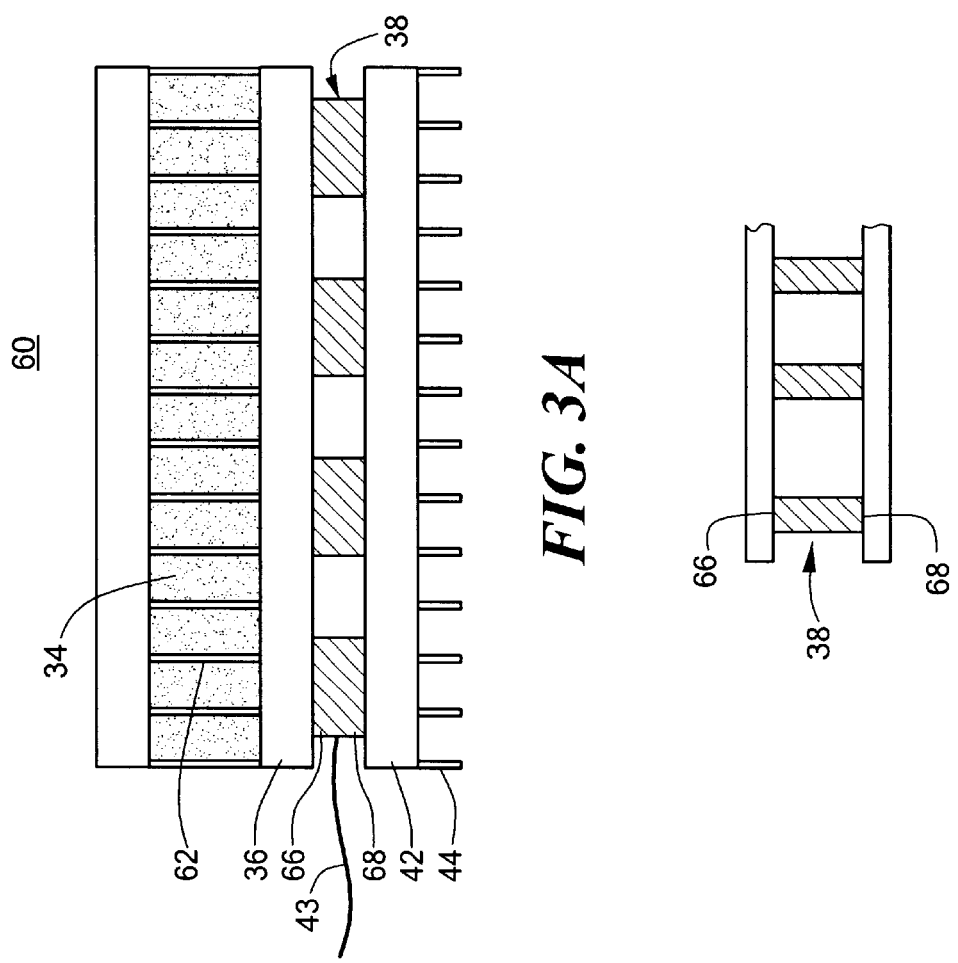

ENVIRONMENTALLY MITIGATED NAVIGATION SYSTEM

RELATED APPLICATIONS

This application claims priority of U.S. Provisional Application Serial Nos. 60/391,549, filed on Jun. 25, 2002 and 60/400,465, filed on Aug. 1, 2002, entitled "High Accuracy Drillhead Navigation System". These applications are incorporated herein by this reference.

FIELD OF THE INVENTION

This invention generally relates to a navigation system that is environmentally controlled for temperature, pressure, and/or vibration and shock. More specifically, the invention relates to a borehole navigation system that is environmentally controlled for temperature, pressure, and/or drilling vibration.

BACKGROUND OF THE INVENTION

For several reasons, it is essential for a drill pipe operator to accurately monitor and guide the direction of the drill bit such that a borehole is created where desired. One reason is that it is expensive to drill a borehole at a cost of about $500,000 per day. Another reason is that it may be necessary by law for an oil rig to log the location of its boreholes at a regular frequency such that the oil rig can be properly monitored. However, the high temperature, pressure, shock, vibration, and size constraints during drilling a borehole can make it difficult for equipment to properly monitor the location of the borehole. Current systems may only achieve a borehole accuracy of about 60 feet for every 25,000 feet drilled, which is not sufficient for some applications.

To determine the location of a termination in a borehole, it is desirable to know the termination's azimuth and vertical orientation. Typically, gyroscopes can be used to determine the azimuth. However, gyroscopes typically do not function adequately in the high temperatures and pressures associated with high depth boreholes. Consequently, gyroscopes typically have not found much commercial acceptance in these applications.

Many prior art systems have attempted to accurately and efficiently monitor the location of the drill bit to determine its location, but each system has had limitations. In one prior art system, the drill bit was removed from the borehole and a monitoring tool was lowered down the borehole to determine its current location. A disadvantage of this system is that it is costly to stop drilling and spend time removing the drill bit to take measurements with the monitoring tool.

In another prior art system, single-axis accelerometers have been used to determine the vertical location of the drill bit. A system such as this, however, does not provide the azimuth of the drill bit, which is necessary to determine the full location of a borehole: a system that uses a single accelerometer is typically only adequate if the oil rig is going to drill a vertical borehole.

In yet other prior art systems, a magnetometer is used to determine the magnetic field direction from which the azimuth is approximated. However, systems such as these must make corrections for magnetic interference and use of non-magnetic drill pipe. Additionally, systems that rely only on magnetometers to determine the azimuth can suffer accuracy degradation due to the earth's changing magnetic field.

BRIEF SUMMARY OF THE INVENTION

It is therefore an object of this invention to provide an environmentally mitigated navigation system that effectively controls the temperature of an inertial measurement unit within an isolating chamber.

It is a further object of this invention to provide such an environmentally mitigated navigation system that can be placed within a drill pipe and lowered into a borehole at great depths.

It is a further object of this invention to provide such an environmentally mitigated navigation system that does not have to be removed from a drilling borehole for inertial measurements to be taken.

It is a further object of this invention to provide an environmentally mitigated navigation system that can control the temperature of the inertial measurement unit at a time when it is not being powered.

This invention results from the realization that, for an environmentally mitigated navigation system, the temperature of an inertial measurement unit can be effectively controlled by a temperature control system that includes a thermoelectric cooling system which when powered cools and maintains the temperature of the inertial measurement unit and a phase change device for maintaining stable temperature window for the inertial measurement unit when the temperature control system is not being powered by an external power device. In another embodiment of the invention, the temperature control system only includes a thermoelectric cooling system that is used while the drilling mud driver provides electric power to the temperature control system.

The invention further features an environmentally mitigated navigation system including a drilling mud driver electric generator, a thermal and pressure isolating chamber, and an inertial measurement unit, for making inertial measurements, that is disposed on the isolating chamber, a temperature control system, and a vibration and shock isolation system for reducing vibration of the inertial measurements at least during drilling periods. The temperature control system includes a thermoelectric cooling system powered by the drilling mud driver for maintaining the inertial measurement unit at a predetermined temperature in a powered mode and a phase change device for maintaining the inertial measurement unit at substantially the predetermined temperature in an unpowered mode while the phase change device changes states to define a stable temperature window for the inertial measurement unit to make inertial measurements during the unpowered mode.

The invention features an environmentally mitigated navigation system that includes a thermal isolating chamber, an inertial measurement unit for making inertial measurements, and a temperature control system. The temperature control system includes a thermoelectric cooling system, which in a powered mode maintains the inertial measurement unit at a substantially predetermined temperature, and a phase change device for maintaining the inertial measurement unit at substantially a predetermined temperature in an unpowered mode. The phase change device substantially maintains the predetermined temperature by changing phase to define a stable temperature window for the inertial measurement unit to make inertial measurements during the unpowered mode.

In a preferred embodiment of the invention, the thermal isolating chamber may be pressure resistant. The inertial measurement unit may include a microelectromechanical sensor (MEMS). The inertial measurement unit may include at least one gyroscope and at least one accelerometer for determining the azimuth and the vertical orientation, respectively, of the inertial measurement unit. The inertial measurement unit may include three gyroscope input axes and three accelerometer input axes. Additionally, the inertial measurement unit may include one or more gimbals for determining one or more measurement biases of the inertial measurement unit. The thermoelectric cooling system may include semiconductor devices. The phase change device may include a medium that changes from solid to liquid near the operating temperature. The medium of the phase change device may be, for example, paraffin. The environmentally mitigated navigation system may include a drilling mud driver electric generator for powering the thermoelectric system in a powered mode. The environmentally mitigated navigation system may also include an isolation system for reducing the vibration and shock of the inertial measurement unit such that inertial measurement can be effectively made.

The invention also features an environmentally mitigated borehole navigation system including a drilling mud driver electric generator, a thermal and pressure isolating chamber, an inertial measurement unit, for making inertial measurements, which is disposed in the isolating chamber, a temperature control system, and a vibration and shock isolation system. The temperature control system includes a thermoelectric cooling system powered by the drilling mud driver electric generator for maintaining the inertial measurement unit at a predetermined temperature. The vibration and shock isolation system reduces the vibration to which the inertial measurement unit is exposed at least during drilling periods.

In a preferred embodiment, the inertial measurement unit may include microelectromechanical system (MEMS). The environmentally mitigated borehole navigation system may include at least one gyroscope and at least one accelerometer for determining the azimuth and the vertical orientation, respectively, of the inertial measurement unit. The inertial measurement unit may include three gyroscopes and three accelerometers. The inertial measurement unit may include one or more gimbals for determining one or more measurement biases of the inertial measurement unit. The thermoelectric cooling system may include a semi-conductor device. The temperature control system may further include a phase change device for maintaining the inertial measurement unit at substantially the predetermined temperature when the thermoelectric cooling system is unpowered and a medium of the phase change device is changing phase. The medium of the phase change device may change phase from solid to liquid near the operating temperature. The medium of the phase change device may be, for example, paraffin.

BRIEF DESCRIPTION OF THE DRAWINGS

Other objects, features and advantages will occur to those skilled in the art from the following description of a preferred embodiment and the accompanying drawings, in which:

FIG. 3A is a cross-sectional schematic diagram of a temperature control system of the environmentally mitigated navigation system of FIG. 2;

FIG. 3B is a cross-sectional schematic diagram of the thermoelectric coolers of the temperature control system of FIG. 3A.

FIG. 4 is a cross-sectional schematic diagram of the inertial measurement unit of the environmentally mitigated navigation system of FIG. 2;

DISCLOSURE OF THE PREFERRED EMBODIMENT

Figure 1:
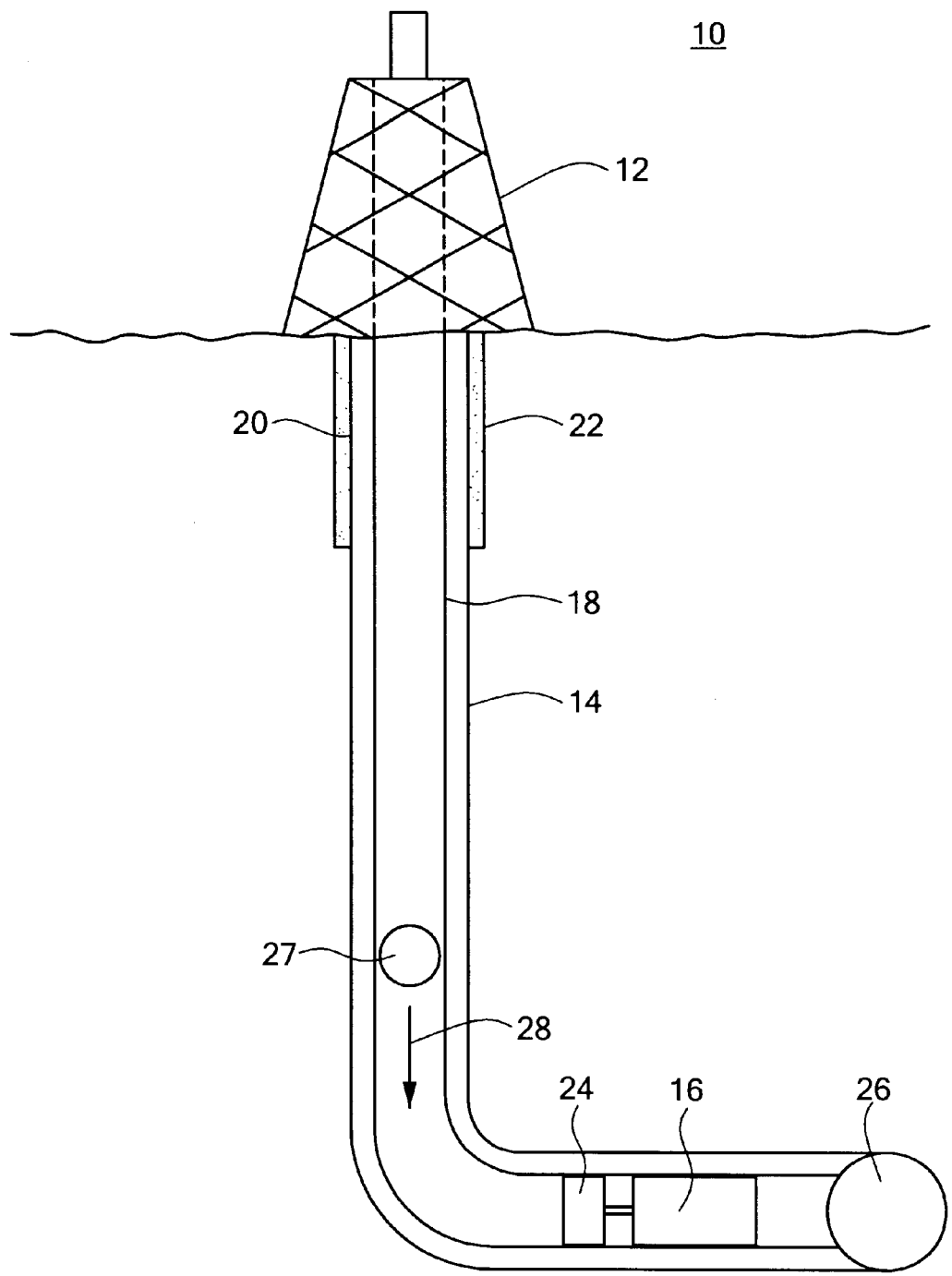
FIG. 1 is a cross-sectional schematic diagram of a drilling system that includes an environmentally mitigated navigation system in accordance with the present invention.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings.

There is shown in FIG. 1 a drilling system 10 that includes drilling rig 12 in borehole 14, and environmentally mitigated navigation system 16. Drilling rig 12 may be located on top of an ocean surface or on a land surface. Borehole 14 includes drill string 18 surrounded by steel casing 20 and cement liner 22. Navigation system 16 includes power section 24 and is adjacent to drill bit 26. While drilling, the mud flows to run the drill bit, so it also runs DC generator 24. Mud 27 is flowed in the direction of arrow 28. Power section 24 provides electrical power to navigation system 16, and changes the battery used when mud is not flowing. Mud is not flowing when drilling stops to add a length of drill pipe. Navigation system 16 is configured to determine the vertical orientation and azimuth of navigation system 16 when drilling is stopped, and to navigate while drilling, such that it can provide the location for drill bit 26 which is located adjacent to navigation system 16.

Figure 2:
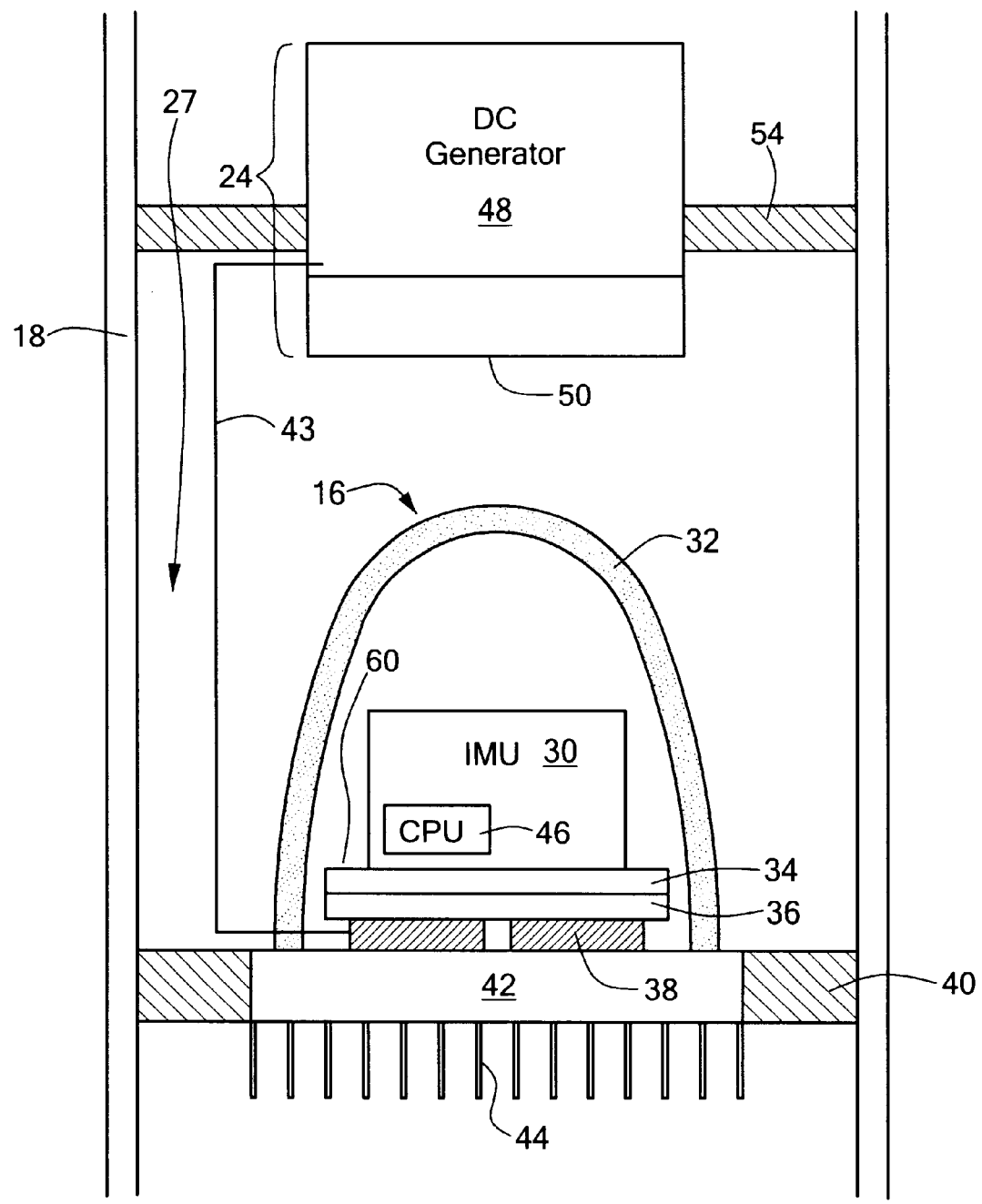
FIG. 2 is a more detailed cross-sectional schematic diagram of the environmentally mitigated navigation system shown in FIG. 1.

As shown in FIG. 2, navigation system 16 includes inertial measurement unit 30, thermally isolating pressure container 32, phase change material (PCM) 34, cold plate 36, thermoelectric coolers 38, one or more shock and vibration isolation mounts 40, hot plate exchanger 42 and heat dissipation fins 44. Isolating pressure container 32 contains IMU 30 and related components for protecting them from the extreme pressure within borehole 14. IMU 30 includes computer or processor 46. Power section 24 includes DC generator 48 and navigator battery 50 for storing electrical power produced by DC generator 48. Mud 27 drives DC generator 48 to produce electricity, which is provided to navigation system 16. IMU 30 also includes gyroscopes and accelerometers and support electronics. Power section 24 is supported on navigation system 16 by mechanical supports 54. Navigation system 16 is supported by shock and vibration isolation system 40.

Temperature control system 60, FIG. 3A, includes phase change material 34 coupled to temperature equalizing fins 62 which are coupled to cold plate 36. Cold plate 36 is adjacent to one or more thermoelectric coolers 38 which are electrically coupled to conductor 43 for providing electricity to run the thermoelectric coolers and the inertial measurement unit. Thermoelectric coolers 38 are adjacent to hot plate 42 which are coupled to heat dissipation fins 44. Thermoelectric coolers 38 include cold junction 66 and hot junction 68 which are shown in greater detail in FIG. 3B.

When mud 27 flows past DC generator 48, power section 24 is configured to generate electricity which is provided to IMU 30 and thermoelectric coolers 38. Thermoelectric coolers 38 cool IMU 30 such that IMU 30 can accurately provide measurements of the vertical location and azimuth of navigation system 16. At times when mud 27 is not flowing through borehole 14, DC generator 48 cannot generate power. In accordance with the invention, phase change material 34 is provided adjacent IMU 30 to cool IMU 30 when DC generator 48 is not providing power. Phase change material 34 cools IMU 30 by absorbing heat when phase change material 34 changes phase, for example, from a solid to a liquid. Phase change material 34 can include a material such as paraffin wax. When phase change material 34 changes phase it is capable of providing a window of time in which the temperature of the IMU 30 is maintained at substantially the same temperature at which DC generator 48 maintains IMU 30 when the DC generator is operational. During the time within the stable temperature window, IMU 30 using its battery is capable of taking accurate calibration/correction measurements of the azimuth and vertical orientation of navigation system 16.

IMU 30 could be strapdown or gimbaled with one, two, or more gimbals. A dual gimbaled IMU 30 is depicted in FIG. 4 with outer gimbal motor 72, inner gimbal 76, inner gimbal motor 74, and instrument measurement platform 78. Outer gimbal 70 includes a gimbal and slip rings or a twist capsule. Outer gimbal 70 includes angle readouts. Outer gimbal motor 72 rotates outer gimbal 70 about its axis stabilizing the outer gimbal in an inertial frame. Inner gimbal 76 includes a gimbal and slip rings or wire twist capsule. Inner gimbal 76 has stops or angle readouts at every 180°. Inner gimbal motor 74 rotates inner gimbal 76 about its axis. Instrument measurement platform 78 can include measurement instruments such as, for example, gyroscopes, accelerometers and magnetometers for determining the location of navigation system 16. Outer gimbal 70 and inner gimbal 76 are used to rotate measurement platform 78 such that any biases inherent with any measurement instrument located on measurement platform 78 can be determined and compensated for.

Figure 5:
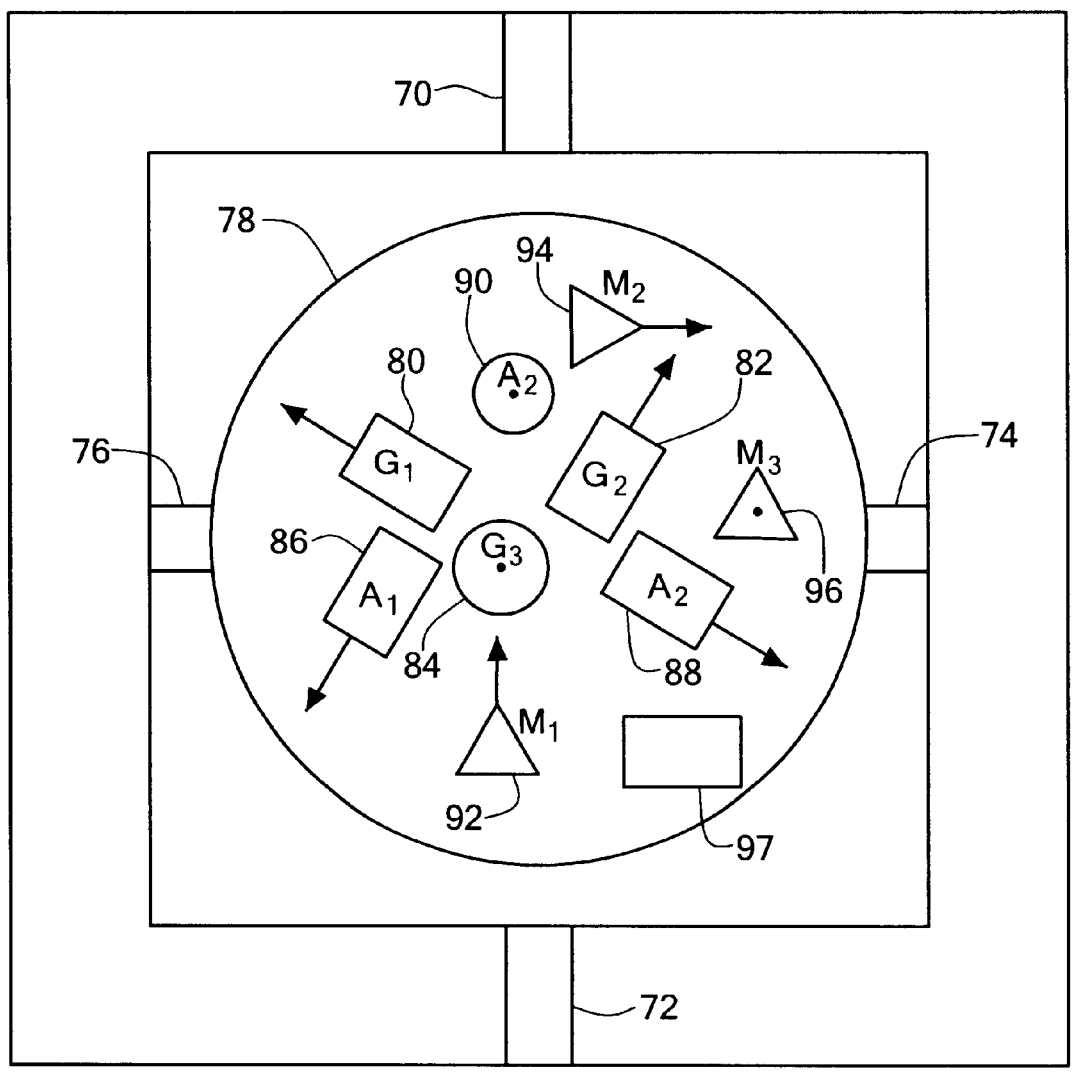
FIG. 5 is a more detailed cross-sectional schematic diagram of the inertial measurement unit of FIG. 4.

Instrument measurement platform 78, FIG. 5, can include, for example, three orthogonal gyroscopes 80, 82, and 84, three orthogonal accelerometers 86, 88, and 90, three orthogonal magnetometers 92, 94, and 96 and proximity electronics 97. Gyroscopes 80, 82, and 84 are each orthogonal to each other such that the gyroscopes can provide three-dimensional data to accurately determine the direction of the earth's rotation, from which the azimuth can be determined once the local vertical is known. Gyroscope 84 is shown as having its orientation directed out of the page in FIG. 5, although other orientations are possible. Accelerometers 86, 88, and 90 are oriented orthogonally to each other such that three-dimensional data can be provided about the local vertical direction of navigation system 16. Magnetometers 92, 94, and 96 are oriented orthogonally to each other for providing three-dimensional data regarding the earth's magnetic field, from which the azimuth can also be determined.

Figure 6:
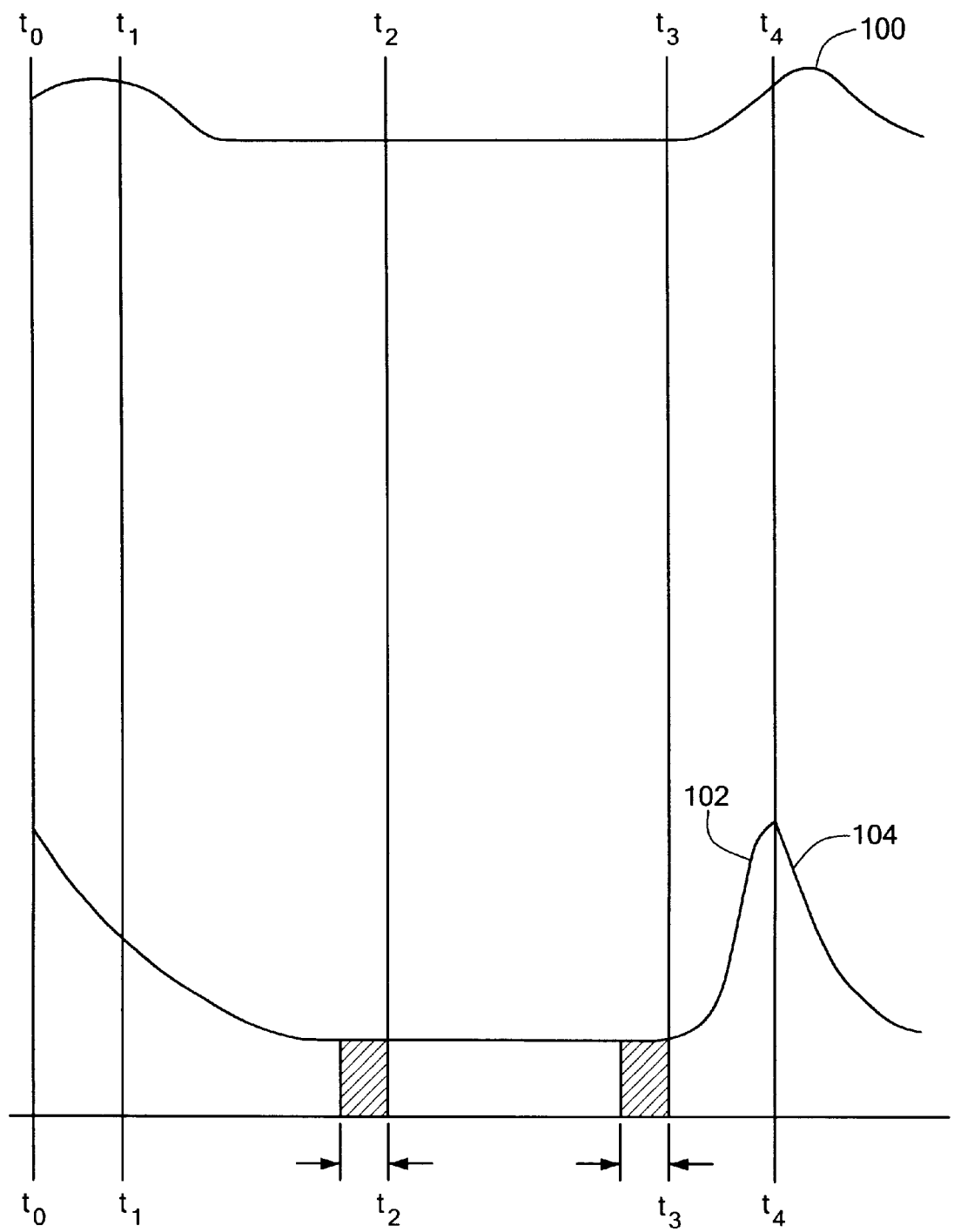
FIG. 6 illustrates temperature vs. time for the inertial measurement unit and the phase change material of the environmentally mitigated navigation system of FIG. 2.

Temperature as a function of time for navigation system 16 over times $t_0$–$t_4$ is shown in FIG. 6. Operation starts at $t_0$. At time $t_1$, drill bit 26, FIG. 1 is drilling borehole 14 and DC generator 48, FIG. 2, is providing electricity to thermoelectric coolers 38 while the IMU is performing its navigation function while drilling. Thermoelectric coolers 38, FIG. 2, cool instrument platform 78, FIG. 5 and phase change material 34, FIG. 2. At time $t_2$, FIG. 6, drill bit 26, FIG. 1 is turned off while pipe is added to the drill string and DC generator 48, FIG. 2 discontinues providing electricity to thermoelectric coolers 38, FIG. 2. As can be seen, between times $t_2$ and $t_3$, the temperature 100 of the navigation system remains substantially constant due to phase change material 34 changing phase and absorbing heat while the IMU is performing gyrocompass or navigation functions. IMU 30 is operated to determine inertial data between times $t_1$ and $t_3$. Between times $t_3$ and $t_4$, the temperature 100 of the IMU begins to rise at $t_3$. Between times $t_1$ and $t_2$, DC generator 48, FIG. 2, recharges navigation system battery 50 and thermoelectric coolers 38 recool IMU 30 and the phase change material 34.

FIG. 6 also shows the temperature of phase change material 34, FIG. 2 as a function of time. Around time $t_0$, phase change material 34 is a liquid. Between times $t_0$ and $t_2$, thermoelectric coolers 38, FIG. 2, change phase change material 34 from a liquid to a solid. Just before time $t_2$, phase change material 34 has become fully solid. Between times $t_2$ and $t_3$, phase change material 34 gradually changes phase from a solid to a liquid and absorbs heat during this phase change. Between times $t_2$ and $t_3$, phase change material 34 creates a stable time period during which the inertial measurement unit 30, FIG. 2, can continue to take accurate inertial measurements. Around time $t_3$, phase change material 34 becomes fully liquefied and can no longer absorb energy. Between times $t_3$ and $t_4$, the temperature 102 of the phase change material begins to gradually rise. At time $t_4$, thermoelectric coolers 38, FIG. 2 are again turned on and phase change material 34 begins to cool again at 104.

In another embodiment of the invention, the temperature control system includes only thermoelectric coolers 38, but does not include phase change material 34. In this embodiment, inertial measurement unit 30 must compensate for any increases in temperature that occurred during the time periods that DC generator 48, FIG. 2, does not provide power to thermoelectric coolers 38.

Phase change material 34 can be selected from the paraffin family such that it can maintain the inertial measurement unit, FIG. 2, at a substantially constant temperature as phase change material 34 changes phase to absorb or release energy. Phase change material can also include one or more different materials with different phase change temperature boundaries such that the temperature of phase change material 34 changes phase at a desired temperature. One example of a phase change material suitable for the present invention includes Decane (C10H22) with a melting point of 110° F. The heat of fusion of paraffins is typically 80 BTU/LBM. If it is assumed that inertial measurement unit 30 generates 5 watts of power and 5 watts of power leaks through isolation pressure container 32, FIG. 2, each pound of phase change material 34 including paraffin would create a stable temperature window for approximately eight minutes at 110° F. To provide a one hour stable temperature window, 0.35 LBM of paraffin would be required. It may be preferable to add metal ribs to phase change material 34 to allow for uniform melting of the phase change material.

Preferably, electronics associated with the instruments in instrument platform 78, FIG. 5 are designed to survive at temperatures of typically 390° F. The control electronics may be fabricated from silicon-on-insulator (SOI), which is capable of operating sufficiently up to temperatures of 480° F.

Devices that can be used for thermoelectric cooler 38 may include monolithic structures of pressed and sintered p-n materials which are very rugged. Crystalline structures are also commonly used for temperature cooling. The pressed and sintered and crystalline devices can operate sufficiently up to 580° F.

Approximately 200 watts of electrical power may be required by DC generator 48 to properly run thermoelectric coolers 38, FIG. 2, such that they can adequately cool inertial measurement unit 30 to a sufficient temperature.

Since the majority of thermoelectric cooling may be required for heat leaks through isolation chamber 32, it may be preferable to evacuate the enclosure formed by isolation chamber 32 in addition to providing isolation within isolation chamber 32.

In one embodiment, thermoelectric coolers 38 are approximately 0.6 inches thick.

An advantage of the invention is that the vertical orientation and azimuth of the navigation system 16 can be determined without removing the navigation system from the borehole. Moreover, measurements using the navigation system are more effective since a phase change material creates a stable temperature window within which the inertial measurement unit 30, FIG. 2 can take accurate measurements.

Another advantage of the present invention is that having inertial sensors such as gyroscopes, accelerometers, and magnetometers that fit within a dual gimbal structure as shown in FIG. 4 reduces temperature stability requirements because sensor bias calibration and gyroscope scale factor calibration can be performed simultaneously with attitude determination. Thus, a shorter stable temperature window is required to take the same measurements.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

Other embodiments will occur to those skilled in the art and are within the following claims:

What is claimed is:

1. An environmentally mitigated navigation system comprising:
    a thermal isolating chamber;
    an inertial measurement unit, for making inertial measurements, disposed on said isolating chamber; and
    a temperature control system including a thermoelectric cooling system which in a powered mode maintains said inertial measurement unit at substantially a predetermined temperature and a phase change device for maintaining the inertial measurement unit at substantially said predetermined temperature in an unpowered mode while the phase change device changes phase to define a stable temperature window for said inertial measurement unit to make inertial measurements during the unpowered mode.

2. The environmentally mitigated navigation system of claim 1 in which said thermal isolating chamber is pressure resistant.

3. The environmentally mitigated navigation system of claim 1 in which said inertial measurement unit includes a micro electromechanical system (MEMS).

4. The environmentally mitigated navigation system of claim 1 in which said inertial measurement unit includes at least one gyroscope for determining the azimuth of said inertial measurement unit and at least one accelerometer for determining the vertical orientation of said inertial measurement unit.

5. The environmentally mitigated navigation system of claim 1 in which said inertial measurement unit includes three gyroscope input axes for determining the azimuth of said inertial measurement unit after slant drilling and three accelerometer input axes for determining the vertical orientation of said inertial measurement unit after slant drilling.

6. The environmentally mitigated navigation system of claim 1 in which said thermoelectric cooling system includes semiconductor junctions.

7. The environmentally mitigated navigation system of claim 1 in which said phase change device includes a medium which is at least partially solid at the instruments' operating temperature.

8. The environmentally mitigated navigation system of claim 1 in which said phase change device includes paraffin.

9. The environmentally mitigated navigation system of claim 1 further including a drilling mud driver electric generator for powering said thermoelectric cooling system in said powered mode.

10. The environmentally mitigated navigation system of claim 1 further including a shock and vibration isolation system for reducing vibration of said inertial measurement unit.

11. The environmentally mitigated navigation system of claim 1 in which said inertial measurement unit includes one or more gimbals configured such that one or more measurement biases of the inertial measurement unit sensors can be determined.

12. An environmentally mitigated borehole navigation system comprising:
    a drilling mud driver electric generator;
    a thermally isolated and pressure proof chamber;
    an inertial measurement unit, for making inertial measurements, disposed in said chamber;
    a temperature control system including a thermoelectric cooling system powered by said drilling mud driver for maintaining said inertial measurement unit at a predetermined temperature; and
    a shock and vibration isolation system for reducing vibration of said inertial measurements at least during drilling periods.

13. The environmentally mitigated bore hole navigation system of claim 12 in which said inertial measurement unit includes micro eletromechanical system (MEMS) gyros and accelerometers.

14. The environmentally mitigated bore hole navigation system of claim 12 in which said inertial measurement unit includes at least one gyroscope for determining the azimuth of said inertial measurement unit and at least one accelerometer for determining the vertical orientation of said inertial measurement unit.

15. The environmentally mitigated bore hole navigation system of claim 12 in which said inertial measurement unit includes three gyroscope input axes for determining the azimuth of said inertial measurement unit and three accelerometer input axes for determining the vertical orientation of said inertial measurement unit.

16. The environmentally mitigated bore hole navigation system of claim 12 in which said thermoelectric cooling system includes a semiconductor device.

17. The environmentally mitigated bore hole navigation system of claim 12 in which said temperature control system further includes a phase change device for maintaining the inertial measurement unit at substantially the predetermined temperature when the thermoelectric cooling system is unpowered and a medium of the phase change device is changing phase.

18. The environmentally mitigated bore hole navigation system of claim 17 in which said phase change device includes a medium which is solid or partially solid at the operating temperature of the inertial measurement unit.

19. The environmentally mitigated bore hole navigation system of claim 12 in which said phase change device includes paraffin.

20. The environmentally mitigated bore hole navigation system of claim 12 in which said inertial measurement unit includes one or more gimbals configured such that one or more measurement biases of the inertial measurement unit can be determined.

21. An environmentally mitigated navigation system comprising:

a drilling mud driver electric generator;

a thermally isolated and pressure proof chamber;

an inertial measurement unit, for making inertial measurements, disposed on said isolating chamber; and a temperature control system including a thermoelectric cooling system powered by said drilling mud driver for maintaining said inertial measurement unit at substantially a predetermined temperature in a powered mode and a phase change device for maintaining the inertial measurement unit at substantially the predetermined temperature in an unpowered mode while the phase change device changes phase to define a stable temperature window for said inertial temperature unit to make inertial measurements during the unpowered mode; and a shock and vibration isolation system for reducing vibration of said inertial measurement unit at least during drilling periods.

* * * * *